United States Patent [19]
Liss

[11] 3,821,629
[45] June 28, 1974

[54] CONVERTER STATION WITH PARALLEL STATIC CONVERTERS

[75] Inventor: Göte Liss, Ludvika, Sweden

[73] Assignee: Allmanna Svenska Elektriska Aktiebolaget, Vasteras, Sweden

[22] Filed: June 21, 1973

[21] Appl. No.: 372,189

[30] Foreign Application Priority Data
July 10, 1972 Sweden.............................. 9079/72

[52] U.S. Cl................................. 321/11, 321/27 R
[51] Int. Cl. ..................................... H02m 1/18
[58] Field of Search........................... 321/2, 11–14, 321/27 R, 5

[56] References Cited
UNITED STATES PATENTS

| | | | |
|---|---|---|---|
| 3,424,948 | 1/1969 | Ravas................................ | 321/11 X |
| 3,526,780 | 9/1970 | Uhlmann et al. .................... | 321/2 X |
| 3,536,985 | 10/1970 | Ekstrom................................. | 321/13 |
| 3,551,778 | 12/1970 | Ekstrom............................. | 321/11 X |
| 3,654,541 | 4/1972 | Kelly, Jr. et al. ..................... | 321/13 |
| 3,670,236 | 6/1972 | Ekstrom............................ | 321/27 R |

*Primary Examiner*—William M. Shoop, Jr.

[57] ABSTRACT

A converter station is composed of two parallel static converters each provided with a control system including a current regulator which is adjusted in accordance with a predetermined load distribution over the two converters. Each of the control systems is provided with an upper and a lower limit value emitter for the control angle. In order to equalize the load distribution between the static converters in the event of a commutation fault in one of them, current sensitive and comparing members are provided which sense the current distribution between the converters. These members emit a signal in the least loaded static converter to the lower limit value emitter in the same static converter for temporarily reducing the lower limit value for the control angle, in response to deviation from the normal current distribution exceeding a certain value.

5 Claims, 3 Drawing Figures

3,821,629

CONVERTER STATION WITH PARALLEL STATIC CONVERTERS

BACKGROUND OF THE INVENTION

1. Field of the Invention

The present invention relates to a converter station comprising two parallel static converters, each provided with a control system with a current regulator adjusted in accordance with a certain load distribution over the two static converters. Further, the control system is provided with an upper and a lower limit value emitter for the control angle.

The invention relates to the conditions prevailing if a displacement should occur in the current distribution between the static converters in the event of a commutation fault which, if the station is operated as an inverter, causes a static converter with a commutation fault to take over the main part of the direct current of the station whereas the load of the other static converter becomes low. This will make it extremely difficult to restore into normal operation the static converter with the commutation fault.

2. The Prior Art

When building up a power transmission with high-voltage direct current for great powers, the converter stations usually comprise a plurality of static converters at the ends of the direct current line. In plants constructed so far, these static converters are connected in series. If the static converters are equipped with ion rectifiers, the series-connection does not offer any significant problems. However, if thyristor rectifiers are employed instead, which seem likely to become predominant in furture plants, a rectifier or commutation fault causes the direct voltage of the entire station to be applied across the remainder of the static converters, the rectifiers of which may then become overloaded.

In order to avoid this risk, it has therefore been suggested, in connection with new projects, to connect the static converters in parallel in the station. The parallel branches are suitably controlled as parallel-connected converter stations, for example according to U.S. Pat. No. 3,526,780, which means that each separate branch is adjusted for a certain load. As a rule, there are no problems to maintain the desired load distribution over the converters during normal operation, but in some cases, and particularly in inverter operation, this distribution may be subjected to unbalance. Such a case has been mentioned in U.S. Pat. No. 3,670,236, in which the control angle in the static converters reaches its uppermost limit.

Another case occurs if there is a commutation fault in a static converter, which, as indicated above, causes this static converter to take up the main part of the current of the station and makes it difficult for the converter to recover. The object of the invention is to restore the balance in such a case and even temporarily overcompensate the unbalance, so that the faulty static converter is temporarily unloaded and can more easily recover.

These commutation faults may be due directly to disturbances in the alternating current network connected to the station so that commutation becomes impossible, or they may be caused indirectly by partial commutation faults or minor disturbances which do not make commutation impossible but which encroach upon the security margin for commutation. In both cases particular protection devices will then come into action and provoke re-ignition of a rectifier, which in practice will appear as a commutation fault.

SUMMARY OF THE INVENTION

As mentioned, the principle according to the invention comprises overcompensation of the unbalance in the load, by providing current means to emit a signal to the lower limit value emitter in the same static converter for temporarily reducing the lower limit value of the control angle, these means being responsive to a deviation from the normal current distribution which exceeds a certain value.

BRIEF DESCRIPTION OF THE DRAWINGS

In other respects the invention will be further described with reference to the accompanying drawing, in which FIG. 1 schematically shows a direct current power transmission, whereas

DESCRIPTION OF THE PREFERRED EMBODIMENTS

Figure 1:
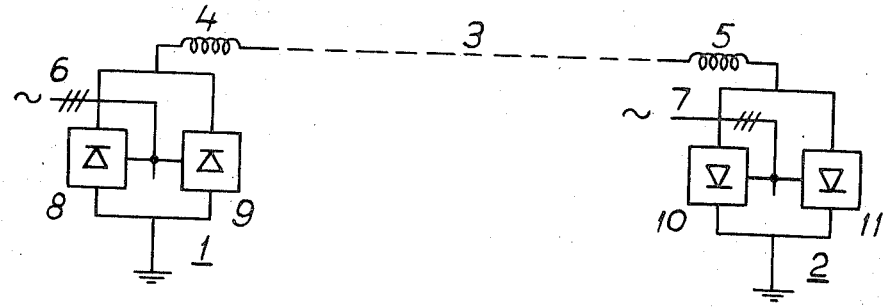

FIG. 1 shows a direct-current transmission comprising two converter stations 1 and 2 with one sole of each connected by way of a direct current line 3 with smoothing reactors 4 and 5, and with the other poles connected by way of earth. Each station comprises two parallel-connected static converters 8, 9 and 10, 11, respectively, each one comprising a rectifier bridge and a converter transformer and control members and auxiliary members. In practice, however, each parallel branch in a station may comprise two or a few series-connected static converters. FIG. 1 shows a transmission with only two stations, but the idea of the invention may also apply to a converter station having two parallel static converters connected to a direct current line to which several other stations are connected.

Figure 2:
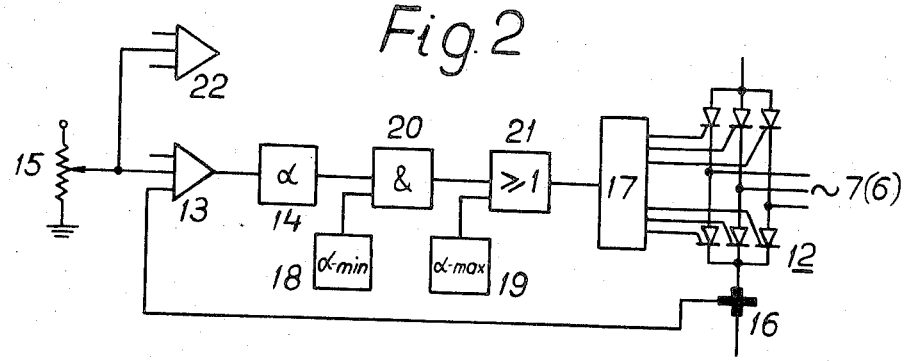
FIG. 2 shows a control system for such a power transmission.

FIG. 2 shows the control system for a six-pulse rectifier bridge 12 in a static converter in one of the stations 1 or 2. The system may be constructed, for example according to U.S. Pat. No. 3,551,778, and comprises a current regulator 13 and a control angle calculator 14 which determines the control angle $\alpha$ for the rectifiers in the rectifier bridge 12. The current regulator 13 is connected on the input side to a desired value emitter 15, which has been symbolized here by a potentiometer but which often consists of a main regulator for transmitted power, for example, Further, a real value emitter is connected to the input side of the current regulator, said emitter being in the form of a transductor 16 connected in a conductor leading to the rectifier bridge 12. Any deviations between the real and desired values of the current will cause a signal from the current regulator 13 to the control angle calculator 14 to change the control angle.

The control angle calculator 14, in turn, delivers signals to a control pulse generator 17 which delivers control pulses, having the control angle dictated from 14, to the rectifiers in the bridge 12.

FIG. 2 also shows a current regulator 22 for the second static converter in the proper station, connected in parallel with the current regulator 13. This second static converter thus has a control system equal to that shown in FIG. 2 and having a current measuring transductor of its own, corresponding to 16 in FIG. 2.

The current regulators 13 and 22 are connected to the same desired value emitter 15 in FIG. 2, which involves a completely uniform load distribution between the two static converters. However, this should only be regarded as an example since the two static converters may be differently dimensioned so that a load ratio different from 1:1 is desired.

Between the control angle calculator 14 and the control pulse generator 17 control angle limiters 18 and 19 are connected by means of an And-Gate 20 and an Or gate 21. The control angle limiter 18 limits the control angle $\alpha$ to a minimum value $\alpha$-min, which is usually around 5° – 10° in the case of rectifier operation and around 100° in the case of inverter operation. The limiter 18 may be constructed as a time device which is neutralized each time the commutation voltage for the proper rectifier starts growing from the value zero. At the given minimum value, $\alpha$-min, a signal is emitted from 18 to 20 and before this the signal from the control angle calculator 14 has no possibility of passing through to the control pulse generator 17.

The limiter 19 is a control device for a so-called margin of commutation, for example according to U.S. Pat. Nos. 2,774,012 or 3,536,985, which, in inverter operation, ensures that the commutation margin is not too small, i.e. that the control angle is not so large that the commutation between the rectifiers in the bridge 12 is jeopardized. Thus, if the signal from the control angle calculator 14 is delayed because of a control signal from the current regulator 13, the limiter 19 will send a signal by way of the Or-gate 21 at the control angle $\alpha$-max making it possible to perform the commutation.

Despite the existence of the $\alpha$-max limiter 19, disturbances in the network voltage or other disturbances may cause a commutation fault in the case of inverter operation, which results in a short-circuit of a phase in the rectifier bridge 12. Even if the disturbance is not so serious that it leads directly to a commutation fault, it may encroach so much upon the security margins set in the control that particular protection devices are released to prevent self-ignition of a rectifier, which may be detrimental to semiconductor rectifiers - thyristor rectifiers. Such a protection device also reacts to so-called partial commutation faults arising in thyristor rectifiers, which means that a number of the series-connected thyristors of the rectifier recover, but not sufficiently many to withstand the growing voltage over the rectifier. The release from a protection device causes the proper rectifier to ignite at a time when it should not ignite, and a provoked re-ignition is obtained which acts as a commutation fault.

In both cases a phase in the rectifier bridge becomes short-circuited, as mentioned, and this also causes the other static converter of the station to become short-circuited, the current of which accordingly falls. The current regulator of this second static converter responds by reducing the control angle which is however limited by the $\alpha$-min limiter 18 in this static converter. This means that the inner direct voltage in this static converter is reduced to the value E cos$\alpha$-min, where E signifies the alternating voltage connected to the inverter. As mentioned, $\alpha$-min is usually set at about 100° in inverter operation, the inner direct voltage thus being around -E0.17, which is still such a high voltage value that the static converter with a commutation fault will take up the main part of the current of the station.

The idea according to the invention is to reduce temporarily the $\alpha$-min of the faultless static converter so that the voltage of this static converter will fall to so low a value that the current of the station is substantially taken up by the faultless static converter. The faulty static converter, on the other hand, is unloaded, thus permitting it to recover. According to a further development of the principle, an order is simultaneously given to the current regulator of the faultless static converter to increase the current in order to accelerate the process.

Figure 3:
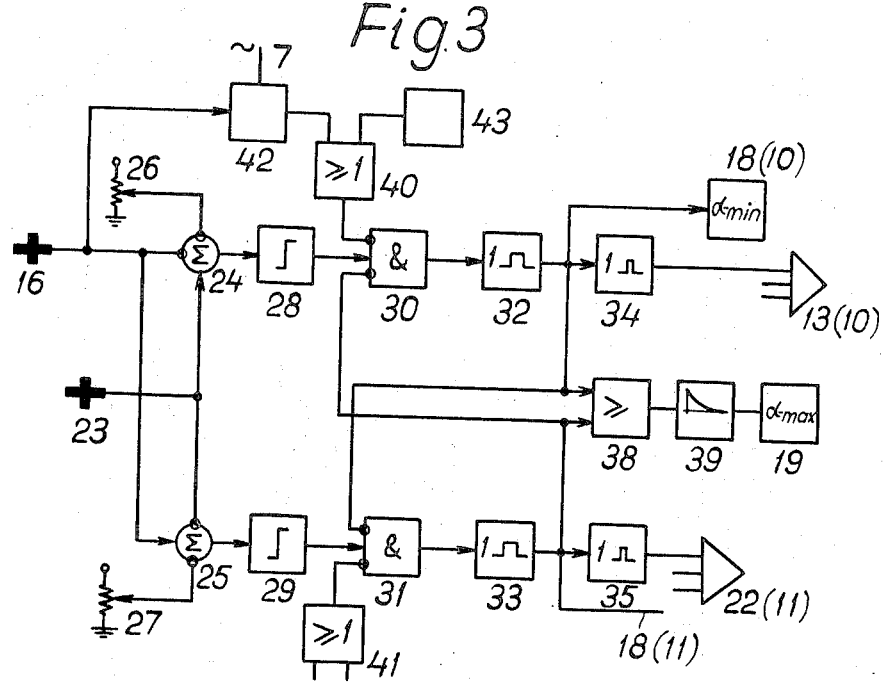
FIG. 3 shows a compensation device according to the invention to facilitate restoring normal operation in a static converter after a commutation fault.

The principle appears more closely from FIG. 3, showing a wiring diagram for a device according to the invention.

The input side of this connection is connected to the measuring transductors 16 and 23 for the two parallel-connected static converters, for example 10 and 11, respectively, in station 2, and the signals from here are transmitted to two summing, or perhaps more exactly subtracting, members 24, 25. In these the difference in current between the two static converters is calculated and with opposite signs in 24 and 25. Also a reference value from the reference value emitters 26, 27 is connected to said members. The output sides of 24 and 25 are connected to And-gates 30, 31 by way of comparing members 28 and 29, respectively, which in principle may have the character of diodes or level discriminators releasing a positive signal from 24 or 25.

A positive signal from 24 passing through to the And-gate 30 thus implies that the difference between the current in the static converters 10 and 11 exceeds the reference value set in 26. This reference value is chosen so high that, when said difference in current exceeds it, it may safely be assumed that a disturbance — probably a commutation fault — has arisen in the static converter 11.

When the current distribution is the same between the two static converters said reference value is the same in 26 and 27, whereas a different current distribution owing to different dimensions of the two static converter should also presuppose different reference values from 26 and 27, or possibly a different transformation ratio in the transductors 16 and 23, in order to obtain suitable, comparable measuring values.

As mentioned, a signal from the And-gate 30 thus signifies an undesirably high current in the second static converter, i.e. 11, and therefore it is desirable to unload this on the static converter 10. This is done by means of a monostable flip-flop 32 which, on a signal from 30, emits a signal of a certain duration to the $\alpha$-min limiter 18 in FIG. 2, $\alpha$-min in converter 10 thus being temporarily reduced. In this way it is possible for the current regulator 13 to reduce the inner direct voltage in 10 from the previously negative value — for example the mentioned -E.0.17 — to zero or perhaps even to a positive value. The static converter 10 takes up the greater part of the current in the station so that the static converter 11 is unloaded and is able to restore its normal commutation.

In order to hasten the process, the signal from the flip-flop 32 is also connected to another flip-flop 34 which increases the current order in the current regulator 13, for example by connecting 34 to an extra input on the regulator 13. The signal from the flip-flop 34 is intended to force the current regulator 13 to adjust the control angle to a lower limit value, so this signal should be of rather short duration. So as to make the current grow up in the faultless static converter, the lower α-min limit must be maintained for some time, and the signal from the flip-flop 32 should therefore be longer than that from 34.

When the faulty static converter 11 has been restored, both static converters 10 and 11 are to return to their normal position, which means that their combined currents are to be reduced to the value set for the station, for example as set in the desired value emitter 15 in FIG. 2. This is simply done by causing that the current regulators 13 and 22, by means of signals to the control angle calculators 14 in the static converter 10 and 11, to increase the control angle towards α-max, the inner direct voltage in the static converters thus approaching its maximum negative value counted in the direction of the direct current.

In order to moderate this procedure and thus avoid any oscillations in the direct current, the α-max should be temporarily limited, which is accomplished by way of an Or-gate 38 influenced from the flip-flop 32 - or 33 in static converter 11 - and controlling a derivative circuit 39 which emits a signal to the α-max limiter 19 to reduce temporarily the α-max in both converters.

The signal from 39 to 19 should be a gradually decreasing signal which first reduces the α-max, after which α-max returns to the normal value.

In FIG. 3 the line 24, 28, etc., to 13 corresponds to the static converter 10 whereas the line 25 to 22 corresponds to the static converter 11. In these two lines the And-gates 30 and 31 are provided with two extra, inverting inputs.

One of said inputs is connected to the flip-flop 33 or 32, respectively, of the other line. The purpose of this is clear when it is considered that a commutation fault in the static converter 11 causes the faultless static converter 10 to take over the main part of the current, which in its turn leads to a signal over 25 and 29 which reacts to this unbalance in the current distribution. If this signal was allowed to pass the And-gate 31, an oscillation would start between the static converters 10 and 11, which is prevented by the fact that the signal from 32 blocks the And-gate 31 and the signal from 33 blocks 30.

The other of the inverted inputs on 30 and 31 is connected to an Or-gate 40 or 41, respectively, which indicates any commutation fault occurring in the proper static converter. This is of importance in case a commutation fault occurs simultaneously in the two static converters, whereby the current distribution between these is quite conditional. As long as a commutation fault remains in the two static converters, they are prevented from assisting each other and it is thus quite senseless to release any of the flip-flops 32, 33. On the other hand, it may be assumed that one of the converters — as a rule the one having the least current — will recover relatively quickly and it will then be possible for it to assist the other converter. As regards the Or-gate 40, it has therefore been shown how one of its inputs is connected to the transductor 16 and alternating current network 7 of the corresponding static converter by way of a measuring and comparing member 42 indicating currents growing in an unexceptional manner, as in the case of a commutation fault. The other input 40 is connected to a protection device 43 of the type which comes into effect in the event of partial commutation faults or when there is a risk of commutation faults. Such a protection device may be designed according to U.S. patent application Ser. No. 7,843 or U.S. patent application Ser. No. 265,197, and as mentioned above it gives a provoked re-ignition of the rectifier with a resultant commutation fault. In this way, a commutation fault of one type or the other in a static converter will block the corresponding And-gate 30 or 31, which, however, only has any significance if a commutation fault simultaneously occurs in the other static converter.

I claim:

1. Converter station comprising two parallel static converters (10,11), each provided with a control system comprising a current regulator (13,22) which is adjusted in accordance with a certain load distribution over the two static converters, the control systems each being provided with a lower and an upper limit value emitter (18,19) for the control angle, each static converter, in order to equalize the load distribution between the static converters in the event of a commutation fault in one of them, being provided with current-sensitive and comparing members (24,28 and 25,29, respectively) to sense the current distribution between the static converters, said members including means to emit a signal in the least loaded static converter by way of a first output (32,33, respectively) to the lower limit value emitter (18) in this static converter for temporary reduction of the lower limit value for the control angle, said last means being responsive to a deviation from the normal current distribution which exceeds a certain threshold.

2. Converter station according to claim 1, in which said comparing members (24,28 and 25,29, respectively) are each provided with a second output (34 and 35, respectively) and include means responsive to such deviation to emit, in the least loaded static converter, from such second output a temporary signal to the current regulator (13 and 22, respectively) of the corresponding static converter to increase the current.

3. Converter station according to claim 1, in which said comparing members (24,28 and 25,29, respectively) are provided with an output (38,39) common for both static converters, and include means responsive to said deviation to emit from said common output a signal to the upper limit value emitter (19) in both control systems for temporarily reducing the upper limit value of the control angle in both static converters.

4. Converter station according to claim 1, in which each of said comparing members (24,28 and 25,29, respectively) is provided with a blocking circuit (40 and 41, respectively) responsive to a commutation fault in the corresponding static converter to block the output (30,31) of the comparing members.

5. Converter station according to claim 1, in which each of said comparing members (24,28 and 25,29, respectively) is provided with a blocking circuit (30 and 31, respectively) which is influenced by the signal from said first output (32 and 33, respectively) in the comparing member of the other static converter.

* * * * *